United States Patent [19]

Powell et al.

[11] Patent Number: 4,572,331

[45] Date of Patent: Feb. 25, 1986

[54] REVERSIBLE FEEDER SYSTEM

[75] Inventors: John H. Powell, Twinsburg; James J. Callahan, Mentor, both of Ohio

[73] Assignee: Lubriquip - Houdaille, Inc., Warrensville Heights, Ohio

[21] Appl. No.: 602,133

[22] Filed: Apr. 19, 1984

[51] Int. Cl.$^4$ ............................................. F16N 25/02
[52] U.S. Cl. ................................... 184/7.4; 137/624.18
[58] Field of Search ............... 184/7.4, 7 E; 137/506, 137/512.5, 624.18, 596.14, 596.18

[56] References Cited

U.S. PATENT DOCUMENTS

| | | | |
|---|---|---|---|
| 2,794,518 | 6/1957 | Pawling | 184/7.4 |
| 3,107,681 | 10/1963 | May | 137/512.5 X |
| 3,414,085 | 12/1968 | Fujita | 184/7.4 |
| 3,866,627 | 2/1975 | Dezelan | 137/512.5 |
| 4,105,094 | 8/1978 | Callahan | 184/7.4 |

FOREIGN PATENT DOCUMENTS

31251 9/1971 Japan ........................... 184/7 E

*Primary Examiner*—Leonard E. Smith
*Attorney, Agent, or Firm*—Hill, Van Santen, Steadman & Simpson

[57] ABSTRACT

A cyclical lubricant feeder utilizing series spool valves to dispense measured quantities of lubricant to dispensing outlets from a common feed source with a plurality of the spool valves arranged in series in valve block assemblies which in turn are in series with one another whereby dispensing through the outlet for each spool valve in a block assembly is in progression with the other outlets from the spool valves in the valve block assembly is provided with a control valve controlling inlet and outlet flow to the valve block assembly bypassing flow from the inlet to the outlet when all of the valves in the block have been shifted to one side and bypassing flow from the outlet to the inlet upon reverse lubricant flow to the block only when all of the valves in the block have been shifted to the other side.

9 Claims, 11 Drawing Figures

REVERSIBLE FEEDER SYSTEM

BACKGROUND OF THE INVENTION

1. Field of the Invention

This invention relates to lubricating devices and more particularly to series spool valve lubricant feeders.

Cyclical lubricant feeder spool valve assemblies have been used for providing lubricant to a plurality of individual lubricant needing portions of a general assembly for some period of time. Such cyclic lubricant feeder spool valve assemblies are frequently used in large machine assemblies, including transfer lines, machine tools and machine clusters. In such embodiments, there are frequently a number of individual points which periodically must be provided with measured quantities of lubricant.

One known type of lubricant feeder shown, for example, in Porter et al U.S. Pat. No. 3,298,460 and Snow et al U.S. Pat. No. 4,312,425, the teachings of which are herein incorporated by reference, employs a valve block having a plurality of individual spool valves received in valve bores. The spool valves are cyclically shuttled between the ends of the valve bores and during each movement dispense a measured quantity of lubricant from their end chambers, i.e., the area between the end of the bore and the full diameter end of the spool valve. Such devices continue to cycle, with the valves moving in sequence, as long as lubricant is supplied to the valve block. Because the spool valves may be of differing size, different points needing lubrication can be supplied with different quantities of lubricant.

This type of device, known as a single line system, employs only a supply line from a lubricant source. All of the lubricant supplied from a prime source (which can be a prior feeder) is distributed within the valve block assembly to individual outlet lines to the machine parts needing lubrication.

Another type of lubrication system commonly in use is a loop system where a closed lubricant loop is utilized. Along the loop, various lubricant dispensing devices may be provided. Different types of loop systems are utilized, including continuous flow loops where the lubricant undergoes a continuous flow in one direction within the loop, and reversing flow loops, where lubrication begins from a lubricant source, is flowed through the loop and through the individual lubricant dispensers, back to the lubricant source. When pressure is received back at the lubricant source, indicating that the lubrication has flowed through the entire loop, the lubricant source reverses flow in the line. This type of loop allows each of the lubricant utilizers to be equipped with dispensing actuated bypasses. That is, each lubricant utilizer, whether it is a single line lubricant dispenser or a multiple line lubricant dispenser, when it has dispensed its predetermined quantity of lubricant, automatically activates a bypass bypassing the remaining lubricant in the loop onto the next lubricant utilizing device. Such lubricant utilizing devices frequently employ spool valves.

Another type of loop system utilizes cyclic series spool valves as the individual lubricant dispensing devices points in a loop line. Such devices make use of series spool valves arranged in a cascade or ladder arrangement. In such ladder arrangements, the lubricant from the loop is ported directly to an end chamber of a valve bore biasing the spool to the other end of the bore to dispense a quantity of lubricant stored in the end chamber at the said other end. The loop line supplied lubricant then spills over, or cascades, from the first end chamber to the end chamber of the next valve bore in the series to push over that valve bore's spool before again cascading or spilling down to the next of the valve bores in the series. When the last of the spools has been shunted, a port will open opening the last of the valve bore's end chamber to the outlet from the valve block back into the loop line.

Reverse flow of lubricant in the loop has the same effect on the other side of the valve bores and again cascades from the first valve bore's end chamber through to the last valve bore's end chamber then to the loop line. This type of system has a distinct advantage over other loop systems in that it allows each lubricant using device in the loop to supply measured quantities of lubricant to a large number of individual lubricant needing areas. For example, in a transfer line, a series valve feeder assembly could be used to supply all of the lubricant needing areas of a given cell on the transfer line with the loop line supplying the entire multicelled transfer line. In such instances, it may be necessary to supply lubricant to a large number of individual lubricant needing areas at each cell. A disadvantage, however, of the cascade or ladder type of lubricant dispenser is that the lubrication must pass through an end section of each of the spool bores in each valve block assembly.

Cyclic lubricant valve block assemblies not utilizing the cascade or ladder system are known which, instead of a cascade, provide lubricant to each of the valve bores in the valve block assembly from a common central feed line that connects to each of the valve bores in the assembly by branch passages. This feed line allows the lubricant to flow to the last of the spool valve bores without the necessity of passing through each of the proceeding spool valve bores in the individual assembly. Such "feed line" feeders have not heretofore been used in reverse flow loop.

It would be an advance in the art if feed line cyclical spool valve lubricant feeder assemblies could be used in reversing flow loop lubrication systems.

SUMMARY OF THE INVENTION

It is therefore a principal object of this invention to provide a means of using feed line cyclic spool valve lubricant feeder assemblies in reversing loop lubrication systems.

This object is achieved by modifying standard feed line cyclic spool valve lubricant feeder by adding to the valve block assembly a control valve block having automatically functioning valve means therein for directing a flow of lubricant entering the control valve block in a first direction through the valve block assembly to bias the individual spools to one end of their respective bores and to then direct the lubricant flow out of the valve block assembly from the control valve block in the first direction and to, upon reversal of flow of the lubricant, receive the lubricant in the reversed flow direction, direct it through the valve block assembly to bias the spools to the other end of their bores and to thence direct the lubricant flow out of the valve block assembly through the control valve block in the reverse flow direction.

In the preferred embodiment, the control valve block utilizes two individual spools which are received in a common bore are which are biased towards opposite ends of the common bore by a spring means interposed between the spools. When lubricant enters the control valve block, it is ported to an end chamber of the bore and is used to bias one of the spools against the spring moving it towards the center of the bore. This movement opens a port to the feed line to supply lubricant to the feed line. That movement or further movement of the control spool opens a second port to provide lubricant to a first of the dispensing valves to bias it towards one end of its bore. This movement will open the feed line through the first spool to an end chamber of the second dispensing spool to bias it towards the opposite end of its bore which in turn opens the feed line movement through the second spool to the end chamber of a third spool, etc. This continues throughout the number of spools within the valve block assembly until the final spool in the assembly is biased towards the opposite end of its bore at which time the feed line is open to a return line to the control valve block which return line is in communication with an outlet port from the control valve block. Reversal of lubricant flow causes the same sequence to occur on the other side of the valve block assembly with the second control spool being biased away from its bore end to open a second passage to the feed line and a passage to the opposite end chamber of the first spool from the end that was previously opened to the lubricant flow by movement of the first control spool. The sequence of operations through the remaining dispensing spools continues until movement of the final dispensing spool in the valve block assembly closes off the first return line and opens a second return line which in turn communicates to the outlet from the control valve block. It will be understood that in the control valve block each inlet functions as an inlet when the lubricant is flowing in one direction and as an outlet when the lubricant is flowing in the other direction.

Assembly of such modified cyclic feed line spool valve lubricant feeder assemblies in series with one another around a single loop is therefor possible with supply of lubricant to each succeeding assembly being dependent upon communication through the prior assembly which in turn is dependent upon the shifting of the dispensing spools in that assembly. The two ends of the loop communicate then to a standard reversing valve assembly which in turn is in communication with a supply pump.

In a modified form of the invention, the feeder is provided with a controllable shunt valve positioned upstream of the control block. The shunt valves include a spool received in a valve bore movable, by influence of a movement control mechanism, such as a solenoid, between first and second positions. In the first position, the shunt valve provides a flow of lubricant from the loop to the control block inlet-outlet, and from the control block inlet-outlet to the loop line on the other side of the feeder assembly. In a second position, the control block is bypassed and flow is provided directly from the loop line through the shunt valve block back to the loop line.

Futher, the control block can be dimensioned in numerous ways. For example, it is possible to dimension the control valve such that a first quanta of movement supplies lubricant from the loop line to the feed line whereas a second quanta of movement is necessary to supply lubricant to the end chamber of the next spool bore. In another embodiment, however, it can be provided for simultaneous provision of pressure to the feed line and to the end chamber.

In the preferred embodiment illustrated, each of the valve blocks, except for the control valve block, is a standard series progressive feeder valve block of the type commercially available from the Lubriquip Division of Houdaille Industries, Inc., Cleveland, Ohio.

It is therefore a general object of this invention to provide an improved reversing loop line lubricant system utilizing feed line cyclic spool valve lubricant dispenser assemblies.

It is another, and more specific object of this invention, to provide a lubricant dispensing system utilizing a reversing loop line with a plurality of individual feeder assemblies in the loop line serially fed from the loop line and dispensing from one half of the valve blocks per feeder per direction of flow of lubricant through the loop line, the feeder assemblies being feed line assemblies.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
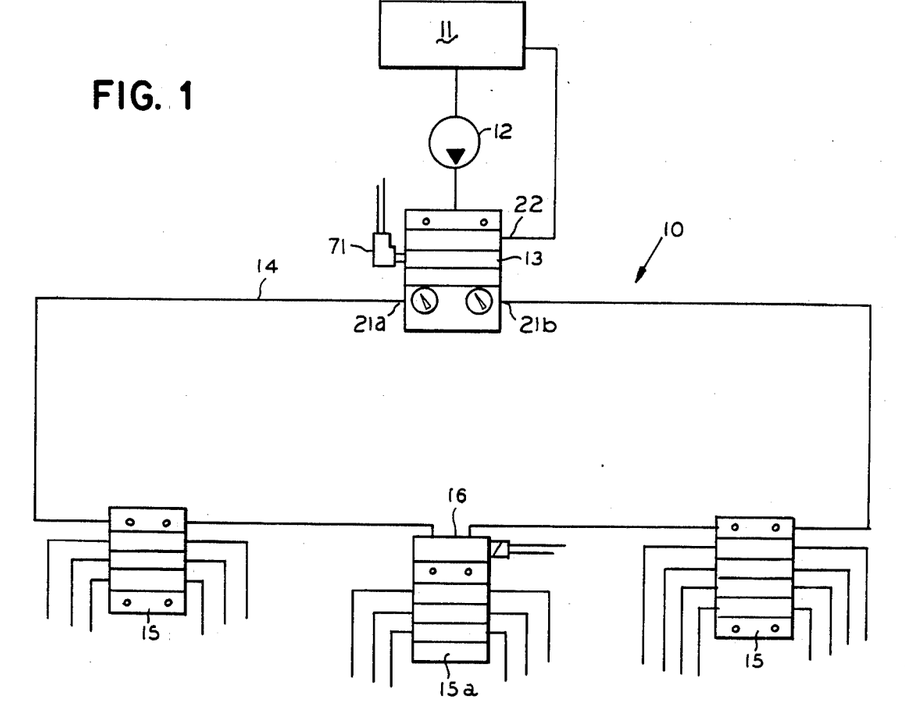
FIG. 1 is a schematic view of a loop lubricant system according to this invention.

FIG. 1 illustrates a reversing loop lubricant supply assembly 10 which consists of a lubricant supply 11, a pump 12, a reversing feeder 13, a single line loop 14 and a plurality of cyclic, feed line, spool valve lubricant dispenser valve block assemblies 15 which are arranged in series about the loop 14. In the embodiment shown, one of the lubricant dispenser assemblies 15a is equipped with a shunt valve assembly 16 whereby it can individually be cut in and out of the loop.

Figure 2:
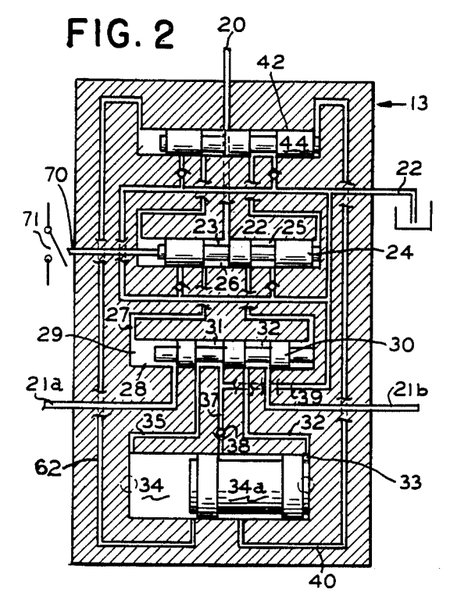
FIG. 2 and FIG. 3 are fragmentary sectional schematic view of a reverser valve of the type usable in connection with this invention.
Figure 3:
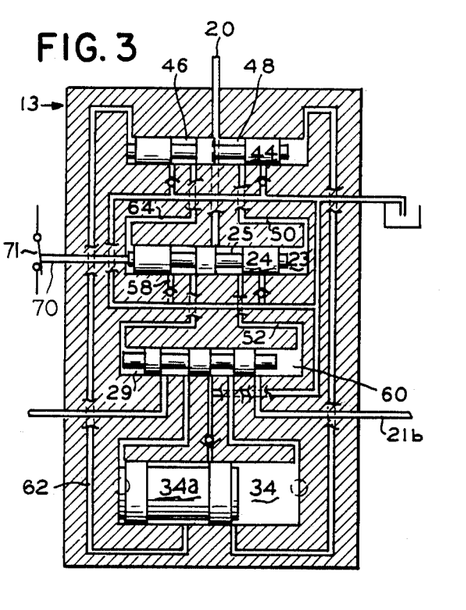

The reverser valve 13 is shown schematically in FIGS. 2 and 3 and consists of an inlet 20, two inlet-outlets 21a and 21b, and a return to reservoir line 22. The device functions as follows: Pressurized lubricant is directed from the pump 12 through the inlet line 20 to a port 22 to bore 23. Bore 23 is provided with a spool 24 having undercuts 25 and 26. In the position shown in FIG. 2, inlet line 20 is open to line 27 through undercut 26. Line 27 in turn is open to the end chamber portion 28 of bore 29 which contains spool 30 similarly equipped with undercuts 31 and 32. With spool 30 biased to the right as shown, the end chamber 28 of bore 29 is open to inlet-outlet line 21 such that lubricant entering the assembly through line 20 will exit through line 21a. This state of affairs will continue until the lubricant has completed the loop 14 and line 21b becomes pressurized. When this occurs, line 21b will communicate through undercut 32 of spool 30 to line 32 which in turn communicates to the end 33 of bore 34. This will cause spool 34a to move to the left from the position shown in FIG. 2 to the position shown in FIG. 3. While this is occurring, lubricant in end space of bore 34 will be forced through line 35 to line 37 via undercut 31 of spool 30. Line 37 having a ball check 38 preventing flow back to the bore 33 will in turn cause lubricant flow passing undercut 31 to follow line 39 to the return line 22 to the reservoir.

Upon movement of the spool 34a to the left in bore 34, communication will be established between lines 32 and 40 with line 40 thus directing the lubricant returned through line 21b to the right hand end of reversing valve bore 42 which contains reversing spool 44. This will cause spool 44 to move to the left as shown in FIG. 3. Spool 44 is equipped with undercuts 46 and 48. Upon movement to the left of spool 44, the inlet line 20 will be communicated through undercut 48 and line 50 to the right hand end of bore 23 to thereby move spool 24 to the left. Movement of spool 24 to the left closes off the communication between the inlet line 20 and line 27 through undercut 23 and opens the communication between inlet line 20 and line 52 through undercut 25. Line 52 communicates to the right hand end of bore 29. Movement of spool 24 to the left will also communicate line 27 to line 58 which in turn is in communication with the reservoir line 22. The communication of line 27 to line 58 through undercut 26 allows the spool 30 to move to the left by dispensing lubricant in the end portion 28 of bore 29 back to the reservoir. This movement of spool 30 provides communication between line 52 and inlet-outlet line 21b through the end section 60 of bore 29. Thus, lubricant will now flow from inlet 20 through bore 23 and undercut 25 to line 52 then through the end portion 60 of bore 29 to line 21b thereby reversing flow of lubricant.

This condition will persist until lubricant has completed flow through the loop when once again line 21a will become pressurized with lubricant flowing in the reverse direction. This will now have the effect of causing the lubricant entering the reversing valve via line 21a to flow through undercut 31 of spool 30 to the left hand end of bore 34 to bias spool 34a to the right forcing the excess lubricant on the right hand chamber of bore 34 through undercut 32 of spool 30 to the exhaust line 22 to the reservoir. The returning lubricant will be communicated through line 62 to the left hand end of bore 42 to bias spool 44 to the right as shown in FIG. 2 thus causing the inlet 20 to be communicated through undercut 46 and line 64 to the left hand end of bore 22 to thus bias spool 24 to the right as shown in FIG. 2. Upon biasing of the spool 24 to the right, inlet line 20 will now be placed in communication with inlet-outlet line 21a through the undercut 26, line 27, and the end portion 28 of bore 29.

It will be noted that spool 24 is equipped with a projecting probe 70 which can contact microswitch 71. In this manner, as the reversing flow of lubricant causes spool 24 to cycle back and forth a time delay can be provided controlling the motor of pump 12 through the opening and closing of the microswitch 71. The microswitch can also provide a fail safe signal which can be used to sense when reversing has not occurred within a predetermined period of time, thereby showing a blockage or leak somewhere in the loop.

Figure 4:
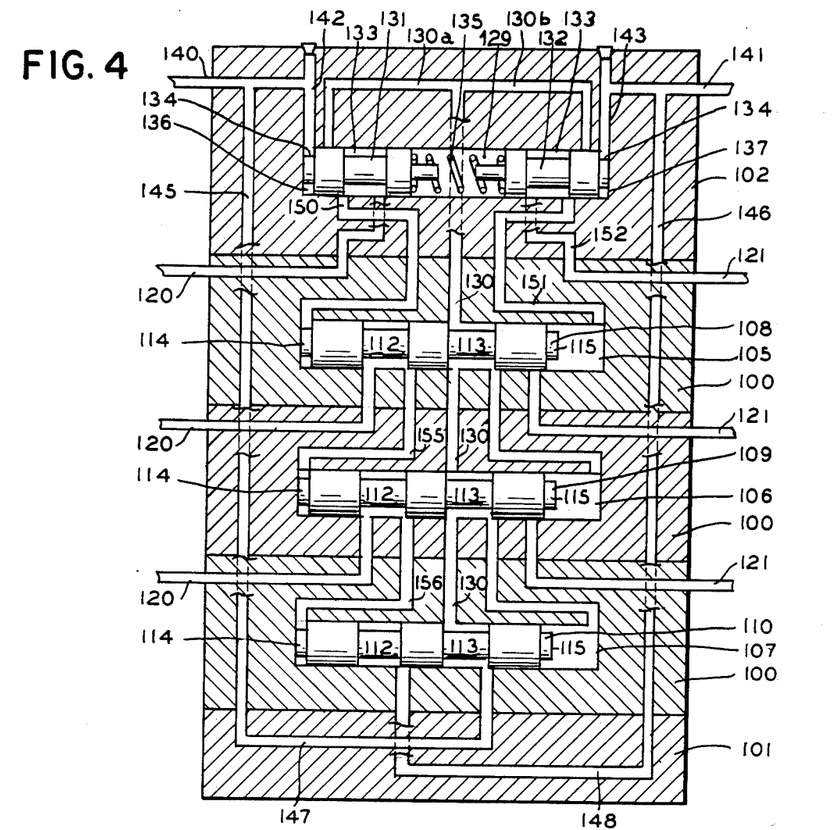
FIG. 4 is a fragmentary schematic view of a valve block assembly according to this invention.

FIGS. 4 through 7 illustrate the cyclic feed line spool valve assemblies of this invention. As shown in FIG. 4, each valve block assembly consists of a plurality of standard individual spool valve blocks 100, an end block 101 and a control block 102. For an explanation of the normal sequencing of the valve blocks 100, reference is made to the aforementioned U.S. Pat. No. 4,312,425. According to this invention, control valve block 102 allows the use of standard feed line valve block assemblies 100 in association with a single line reversing flow loop.

The valve block assembly illustrated has three dispensing spools received in dispensing bores. A greater number of spool valve blocks may be used if desired in each block assembly. The bores 105, 106 and 107 are each equipped with spools 108, 109 and 110 which are substantially identical in their construction. Each spool includes undercut areas 112 and 113 and axial end undercuts 114 and 115. The end undercuts 114 and 115 allow the definition of end chambers at the opposite axial ends of the bores 105, 106 and 107.

In addition, each of the valve blocks 100 is provided with left and right hand side dispensing ports 120 and 121. These ports communicate through lines which are herein referred to by the same numbers, i.e., 121 and 120, which in turn communicate to other lines which in turn communicate through prior spool undercuts to the end chambers of the dispensing spool. Additionally, each spool is provided with a central port which is in communication with line 130. Line 130 is common to all of the assemblies 100 and is in simultaneous communication with each of the bores 105, 106 and 107. Line 130 is the feed line which distinguishes this style of cyclic spool valve lubricant dispenser from other styles such as, for example, cascade or ladder systems.

Control block 102 includes a control valve bore 129 which contains two control spools 131 and 132 therein. Each of the control spools includes a central undercut 133 and an end undercut 134. The spools 131 and 132 are shorter than the axial length of bore 129 and are biased apart from one another by spring 135 towards the opposite ends 136 and 137 of the bore 129. In addition, the control block is provided with combination inlet-outlet ports 140 and 141 which are in communication with the end chambers 136, 137 of bore 129 through lines 142, 143. The inlet-outlets are also in communication with lines 145 and 146 which in turn communicate with lines 147 and 148 of the end cap 101. Line 130, the feed line, also communicates with bore 129 through branches 130a and 130b which communicate with the bore 129 adjacent its ends but spaced from the lines 142, 143, which are open to the bore close to its axial ends.

OPERATION OF THE VALVE BLOCK ASSEMBLY

Figure 5:
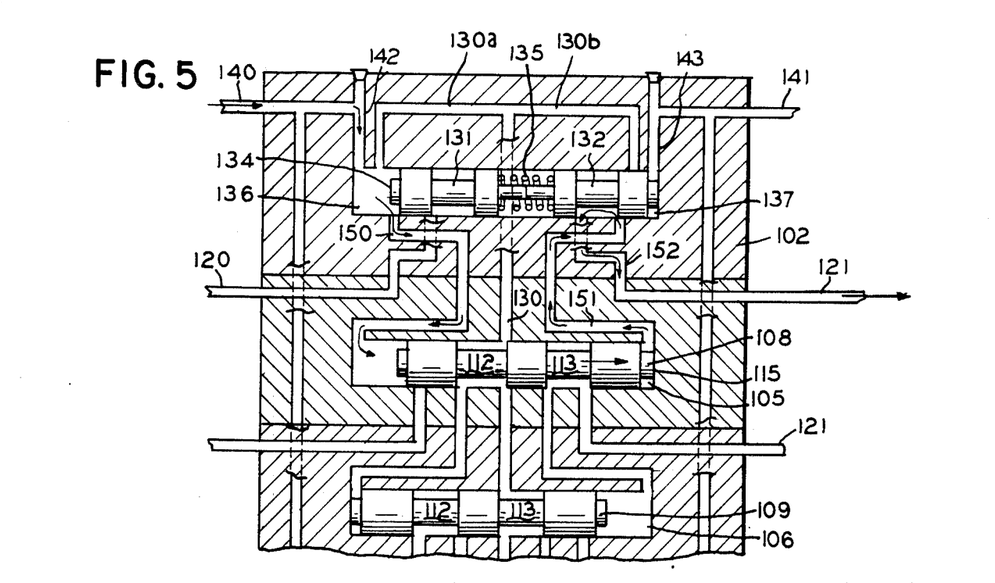
FIGS. 5 through 7 are fragmentary schematic views similar to FIG. 4 showing differing sequences of flow through the valve block assembly of this invention.
Figure 6:
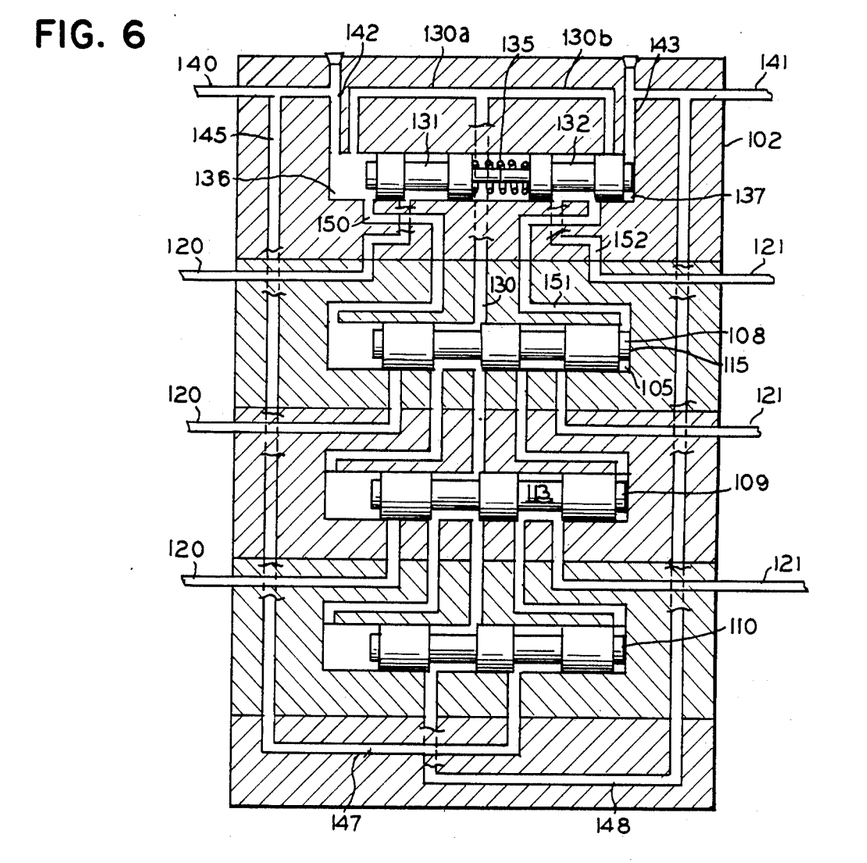
Figure 7:
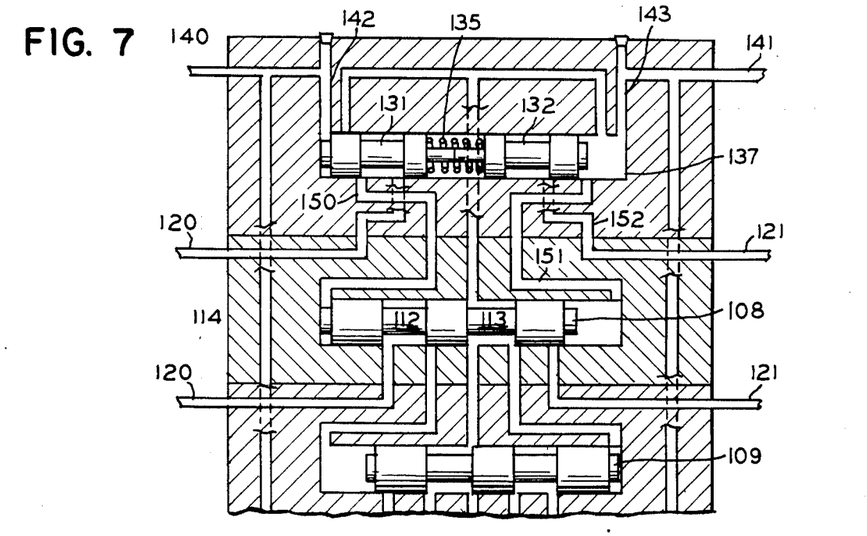

Assuming that the valve block assembly of FIG. 4 is assembled into the loop line with the inlet-outlets 140, 141 connected to the loop line 14, and assuming that the lubricant flow is from left to right of FIG. 4, the valve block assembly will function as follows: Lubricant entering the inlet-outlet 140 will pass via line 142 to the end 136 of the control valve bore 129 where it will bias spool 131 towards the right until communication occurs between line 142 and 130a. Movement of the spool will compress the spring 135 and will act to maintain spool 132 against the end of the bore opposite the end 136. Communication of line 142 with line 130a will supply pressure lubricant to the feed line 130. Spool 131 will continue to move to the right until line 150 is opened. Line 150 is in communication with the end portion of bore 105 of the first of the dispensing spool valves. This will cause spool 108 to be biased towards the right. Lubricant in the right hand end portion of bore 105 will be forced through line 151 to the control bore 129 then via undercut 133 of spool 132 to line 152 which in turn is in communication with dispensing port 121 (FIG. 5). Upon the shifting of spool 108 to the right, line 130, the feed line, will be in communication with line 155 via undercut 112. This will supply pressure lubricant from the feed line 130 to the left hand end of the second dispensing spool valve bore 106 to shift spool 109 to the right. Upon the shifting of the spool 109 to the right, the right hand end portion of the bore 106 will dispense its lubricant through the undercut 113 of spool 108 thence to the outlet 121 associated with the valve block containing bore 106. Movement of valve 109 to the right will communicate feed line 130 via undercut 112 of valve 109 to line 156 which in turn communicates to the left hand end of bore 107. This will cause spool 110 in bore 107 to be shifted to the right dispensing the end portion lubricant via undercut 113 of the spool 109 to the dispensing outlet 121. This can continue for as many valve blocks as are provided in the valve block assembly, it being appreciated that FIG. 4 only illustrates three dispensing valve blocks. Upon the shifting of the last of the spools in the valve block assembly, spool 110 in FIG. 4, feed line 130 will be open to passage 148 through undercut 112 of the final spool 110. Line 148 is in communication with inlet-outlet 141. Thus, upon the shifting to the right of spools 108, 109 and 110, lubricant will now flow from left to right through the assembly from inlet-outlet 140 through line 142 to line 130a to feed line 130 through undercut 112 of spool 110 to line 148 to inlet-outlet 141. Since feed line 130 is a direct passage which only has lateral subpassages to the individual dispensing bores, the path through the valve block assembly is relatively unencumbered and the pressure drop experienced can be small in comparison with cyclic spool valve lubricant dispensers of the cascade or ladder type where the flow must pass in turn through each of the dispensing bores.

It will be appreciated that upon reversal of flow through the loop line such that inlet-outlet 141 now becomes the inlet and that flow is from right to left, that a movement cycle of the spools within the assembly will recur in exact reverse of the above described. Thus, control spool 132 will be moved to the left as pressure builds in the end section 137 thereby initially communicating line 143 with line 130b and thereafter communicating line 143 with line 151. Communication of line 143 with line 130b supplies pressure fluid to the feed line 130 where communication of line 143 to line 151 will bias spool 108 to the left forcing lubricant in the end 114 to communicate with the outlet 120 through line 150 and the undercut 133 of control spool 131. It will be appreciated that upon the cessation of the presence of high pressure lubricant in line 142, due to the reversal, that control valve 131, under the bias of the spring, will have moved to the left in the control bore 129. It will be further appreciated that the movement of the spools will continue in normal fashion with the spools now moving to the left until line 130 communicates through undercut 113 of spool 110 in bore 107 thereby communicating feed line 130 with line 147 to the inlet-outlet port 140.

Figure 8:
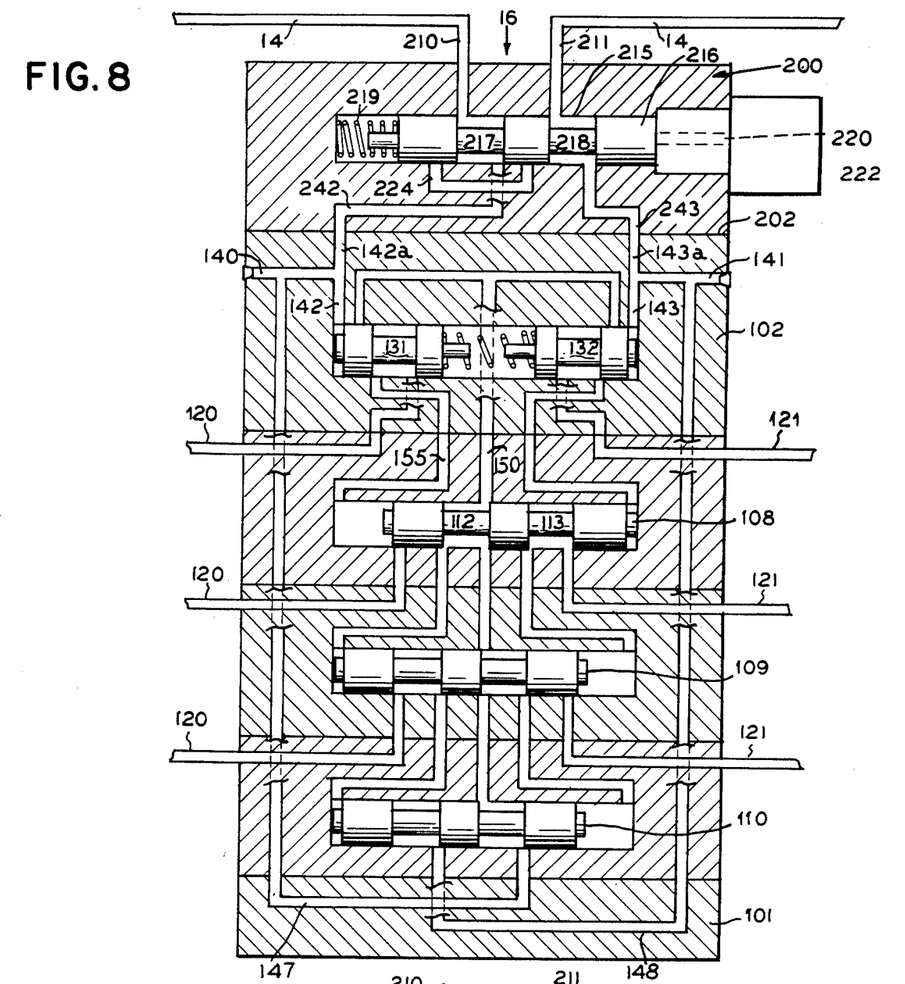
FIGS. 8 and 9 are fragmentary schematic views of a modified form of this invention provided with a shunt valve.
Figure 9:
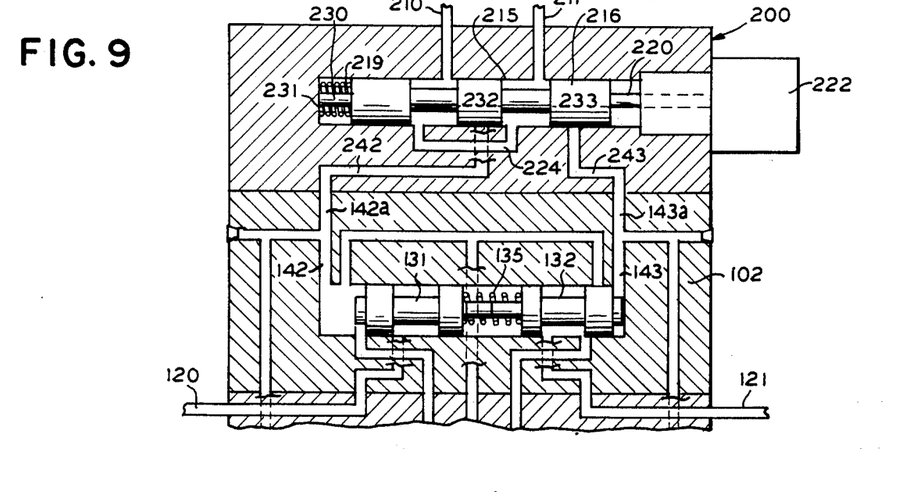

FIGS. 8 and 9 illustrate a modification of the cyclic feed line spool valve lubricant dispenser assembly of this invention, the modification being that shown at 16 in FIG. 1. The modification involves the use of a shunt valve block 200 controlling lubricant flow to the control valve block 102 of the assembly of FIG. 4. In making this modification, inlet-outlet lines 140 and 141 are plugged in the control valve block 102 and lines 142(a) and 143(a) (shown plugged in FIG. 4) are opened to the end face 202, the lines 142(a) and 143(a) being extensions, as shown in FIG. 8 of lines 142 and 143.

The shunt block valve 200 is provided with inlet-outlets 210 and 211 which communicate to shunt valve bore 215 which receives shunt spool 216. The spool 216 is provided with intermediate undercuts 217 and 218 and is biased by spring 219 towards the right hand end of the bore 215 where a pilot extension 220 of the shunt is in operative association with actuator 222. Actuator 222 may be a solenoid actuator or may be otherwise constructed and is effective to, when activated, bias spool 216 to the left against the spring 219.

When in the position illustrated in FIG. 8, flow from the loop line 14 of lubricant will be directed through lines 242 or 243 to the appropriate line 142(a) or 143(a) of control valve block 102 such that the cyclic feed line spool valve lubricant dispenser assembly with which control block 102 is associated will be operative in the same manner as described in connection with FIG. 4. When it is desired, however, to bypass that lubricant dispenser assembly, as shown in FIG. 9, the actuator 222 is activated, moving spool 216 to the left end bore 215 until the pilot end 230 bottoms against the left hand end 231 of the bore with the spring 219 compressed. At this point, the raised diameter lands 232 and 233 will block lines 242 and 243 and the undercuts 217 and 218 will be in communication through line 224. Thus, lubricant entering either of the lines 210 or 211 will exit the other of the lines after passing through the undercuts and line 224. In this manner, the lubricant dispenser assembly associated with control block 102 will be effectively bypassed.

Figure 11:
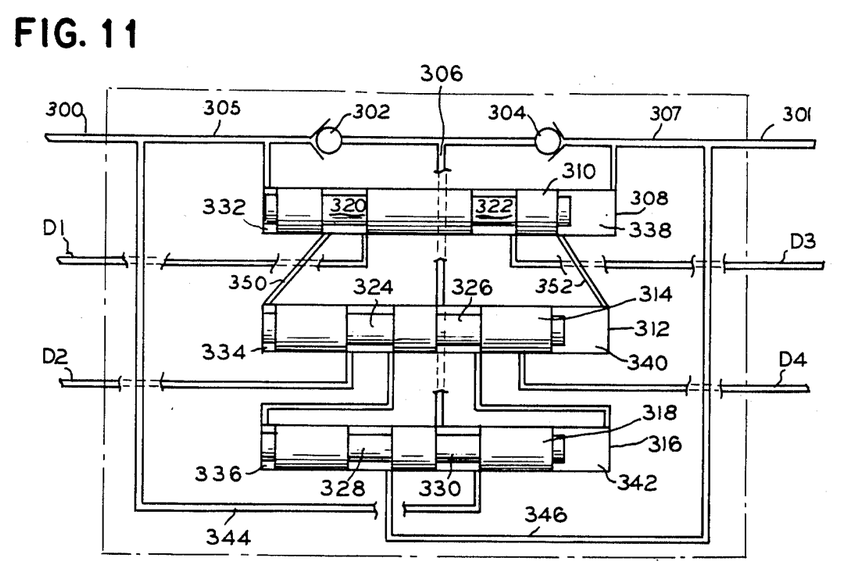
FIG. 11 is a view similar to FIG. 5 illustrating yet another embodiment of this invention.

FIG. 11 illustrates yet another embodiment of this invention which functions similarly to the embodiment of FIG. 4 but which utilizes one way check valves between the inlet-outlet ports. As illustrated in FIG. 11, the cyclic feed line lubricant dispenser assembly is provided with inlet-outlet ports 300 and 301 which communicate respectively with lines 305 and 307 which in turn are provided with one way check valves 302 and 304 before communicating with the central feed line 306. The block is provided with three spool valve bores 308, 312 and 316 which contain a control spool 310 and dispensing spools 314 and 318. The control spool 310 is provided with undercuts 320 and 322 and the spool is free to move between ends 332 and 338 of bore 308. Dispensing spool valve 314 is provided with undercuts 324 and 326 and is free to move between ends 334 and 340 of bore 312. Finally, spool 318 is provided with undercuts 328 and 330 and is free to move between ends 336 and 342 of bore 316. Feed line 306 communicates with the central reaches of both bore 312 and 316. Line 346 communicates with the last of the bores, in this instance, bore 316, and with inlet-outlet line 301 while line 344 communicates with inlet-outlet line 300 and with the last of the bores, 316. Dispensing lines D1-D4 are provided for dispensing lubricants to lubricant demanding areas.

Assuming the lubricant is flowing in inlet-outlet line 300, the lubricant will be provided to the end 332 of the control valve bore 308 and simultaneously pass check valve 302 to feed line 306. Check valve 304 will prevent lubricant from passing direct to line 307. Presence of lubricant under pressure in the end 332 of bore 308 will bias control spool 310 to the right, thus communicating line 350 to the end 332. Any lubricant in the end 338 of bore 308 will, during translation of the spool 310 to the right be ported out line 307. The presence of high pressure lubricant in line 350 will bias the spool 314 to the right. This movement of spool 314 to the right will dispense lubricant from the end 340 of bore 312 to dispensing line D3 via undercut 322 of spool 310. Additionally, feed line 306 will now be ported to the end 336 of bore 342 via the undercut 324 of spool 314. It will be appreciated that the feed line 306 is always in communication with the center of each bore, except for the control bore. The presence of high pressure lubricant from the control line 304 at the end 336 of bore 342 will translate spool 318 to the right thereby forcing lubricant from the end 342 to be dispensed through line D4 via undercut 326 of spool 314. Upon translation of spool 318 to the right, feed line 306 will be in communication with line 346 via undercut 328. Line 346 is in communication with inlet-outlet 301 and thus lubricant will now flow through the valve assembly. Upon reversal of flow with high pressure lubricant being directed to the assembly from inlet-outlet 301, the sequence will be reversed. High pressure lubricant will now be provided via line 307 and pass check valve 304 to the feed line 306 and to the end 338 of bore 308. This will cause spool 310 to be translated to the left thus opening line 352 to the end of bore 312 to provide high pressure lubricant from line 307 to the end chamber 340 to translate spool 314 to the left. Translation of spool 314 to the left will cause flow of lubricant at the left hand end chamber 334 to be dispensed out of port D1 via undercut 320 of spool 310 and will also open feed line 306 to the end 342 of bore 316 via undercut 326 of spool 314. This will translate 318 to the left in bore 316 thus dispensing lubricant from the end 338 of bore 316 out through outlet D2 via undercut 324 of spool 314. At this point, feed line 306 will be in communication with line 344 via undercut 330 of spool 318. Line 344 being in communication with the inlet-outlet 300 will provide for flow of lubricant through the assembly from inlet-outlet 301 via line 307 past check valve 304 through feed line 306 through undercut 330 to line 344, and through line 344 to inlet-outlet 300.

Figure 10:
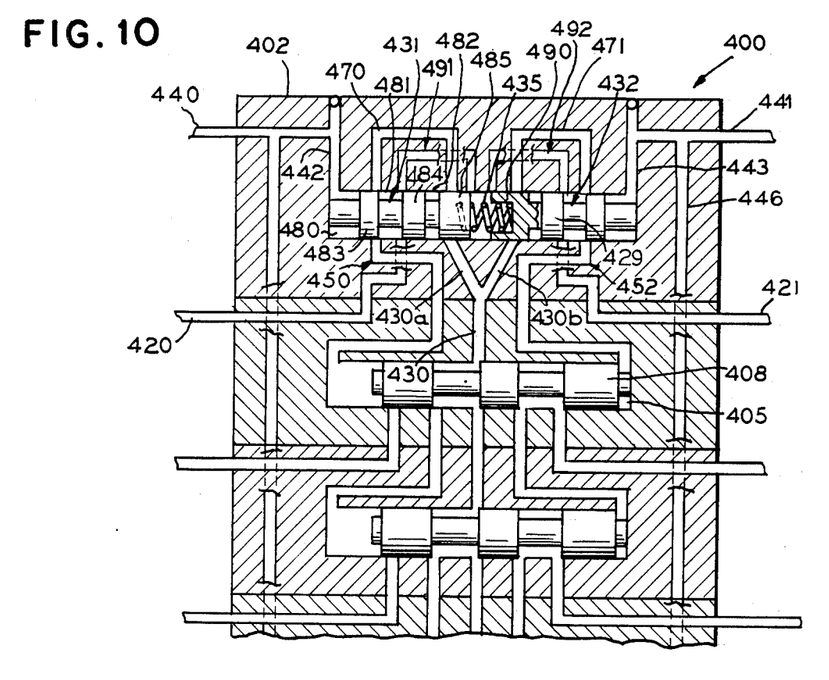
FIG. 10 is a fragmentary view similar to FIG. 4 illustrating the modified control block.

FIG. 10 illustrates a variation on the device of FIG. 4. Similar functioning bores, lines and passageways of FIG. 10 are numbered the same as in FIG. 4 except that the numbers are given a 400 series in place of the 100 series numbers of FIG. 4.

In the embodiment of FIG. 10, the control spools 431, 432 are modified from the prior design so that each spool has three undercuts and three lands. The undercuts are provided at 480, in the end chamber, at 481, intermediate lands 483 and 484, and at 482, intermediate lands 484 and the inside end land 485. The spool may be recessed at 490 for receipt of the spring 435. In addition, the control bore 429 is provided with different line entrances. In place of line 130a of FIG. 4, which was opened by movement of the control spool 131, bore 429 has two lines, 470 and 430a. Line 470 is positioned opposite line 450 so that movement of control spool 431 to the right from that shown in FIG. 10 will simultaneously open lines 450 and 470 at the left through the undercut 480 at the end of the control spool. Simultaneously, lines 430a and the other end of line 470 will be in communication through undercut 482 between lands 484 and 485. Thus lubricant entering inlet-outlet 440 will now pass through line 442 to the end chamber surrounding the undercut 480, then simultaneously through line 450 to the end chamber of spool 408 in bore 405 to bias it to the right and line 470, which will communicate with line 430a to feed line 430 through the undercut 482, thereby supplying lubricant to the feed line 430. The remaining actions of the feeder block will be substantially the same. It will be noted that in the embodiment of FIG. 10, the area between the interior end lands of the control spools 431 and 432 in which the spring 435 operates, is vented as at 491.

It can therefore be seen that this embodiment also provides a feed line cyclic spool valve lubricant dispenser assembly with the ability to function in a reversing loop.

It will therefore be appreciated from the above that this invention provides a cyclic spool valve lubricant dispenser assembly of the feed line type modified by a control valve to be used in reversing loop feeder systems with the spool valve assembly shifting each of its dispensing valves once during each reversal of pressure in the lubricant loop.

Although the teachings of our invention have herein been discussed with reference to specific theories and embodiments, it is to be understood that these are by way of illustration only and that others may wish to utilize our invention in different designs or applications.

We claim as our invention:

1. In a lubricant feeder system having a reversing valve feeding lubricant alternately in opposite directions through a loop line having its opposite ends connected to the reversing valve and a plurality of flow divider stations connected in series in said loop line, at least one lubricant dispensing outlet from each station and a series of spool valves in each station controlling lubricant flow to said dispensing outlet, a common loop line inlet at each station, and a common loop line outlet at each station, the improvement of a single interior feed line in each station, interior passages in each station joining each of said spool valves with said single feed line, a spool bore for each spool valve, each spool valve being shifted in its bore in response to shifting of a prior spool valve in the series, said spool valves having undercut sections intermediate the ends thereof, station interior passages connecting each of said outlets to an end face chamber of a spool valve via an undercut section of another spool valve in the series, line means communicating the common loop line inlet with the common outlet through said single interior feed lines, and control valve means within the stations controlling flow of lubricant between said common line inlet and said common line outlet.

2. A series progressive lubricant feeder comprising: a valve block assembly including a plurality of individual spool valve assemblies arranged in series relationship, each spool valve assembly including a spool movable in a valve bore having end chambers and port means for the end chambers with at least some of the port means communicatable with dispensing outlets intermediate the end chambers of another spool valve assembly, a feed line in said valve block assembly communicating with a plurality of said end chambers to feed lubricant to said chambers, two valve block inlet-outlet ports, control valve means, passages interior of the valve block assembly communicating the two inlet-outlet ports with one another and with the feed line, and said control valve means including a first valve bore and a pair of spools in said first valve bore.

3. The feeder of claim 2, including a spring between the pair of spools effective to bias each of the pair towards the opposite ends of the first valve bore.

4. The feeder of claim 3, wherein each of the pair of spools includes a first reduced diameter end portion at an end of each of the spools remote from the spring to define a first undercut and a second reduced diameter portion intermediate first and second full diameter portions, first passage lines interior of the valve assembly from each of the inlet-outlet ports to an end portion of the first valve bore means, second passage line means from adjacent each of the end portions to the feed line, the spring biasing the pair of spools to close the second passage lines by full diameter portions of the spools.

5. A cyclic feed line spool valve lubricant dispenser assembly for use in reversing flow lubrication systems comprising a valve assembly station having a plurality of individual dispenser valve assemblies arranged in series to one another, each of said dispenser valve assemblies including a valve bore and a spool received in the valve bore for movement between opposite ends of the valve bore, a common feed line providing lubricant to a plurality of said valve bores substantially simultaneously, said assembly having first and second inlet-outlet ports, a control valve for controlling flow of lubricant through said assembly from a first inlet-outlet port to a second inlet-outlet port an interior pathway including portions of said feed line connecting said ports, said valve assembly having a shunt valve controlling flow of lubricant between said first and second inlet-outlet ports, and said shunt valve having a first position bypassing the remainder of the assembly and a second position directing lubricant through the assembly.

6. A device according to claim 5, wherein the shunt valve includes an actuator member for controlling movement of the shunt valve between the first and second positions.

7. A device according to claim 6, wherein the control valve includes first and second spools received in a common bore with spring means biasing the spools away from one another.

8. A device according to claim 7, wherein the shunt valve is a spool valve.

9. A device according to claim 8, wherein the actuator is a solenoid.

* * * * *